R. K. YACOOBIAN.
CANDY AND PROCESS FOR MAKING SAME.
APPLICATION FILED APR. 30, 1908.
921,052.
Patented May 11, 1909.
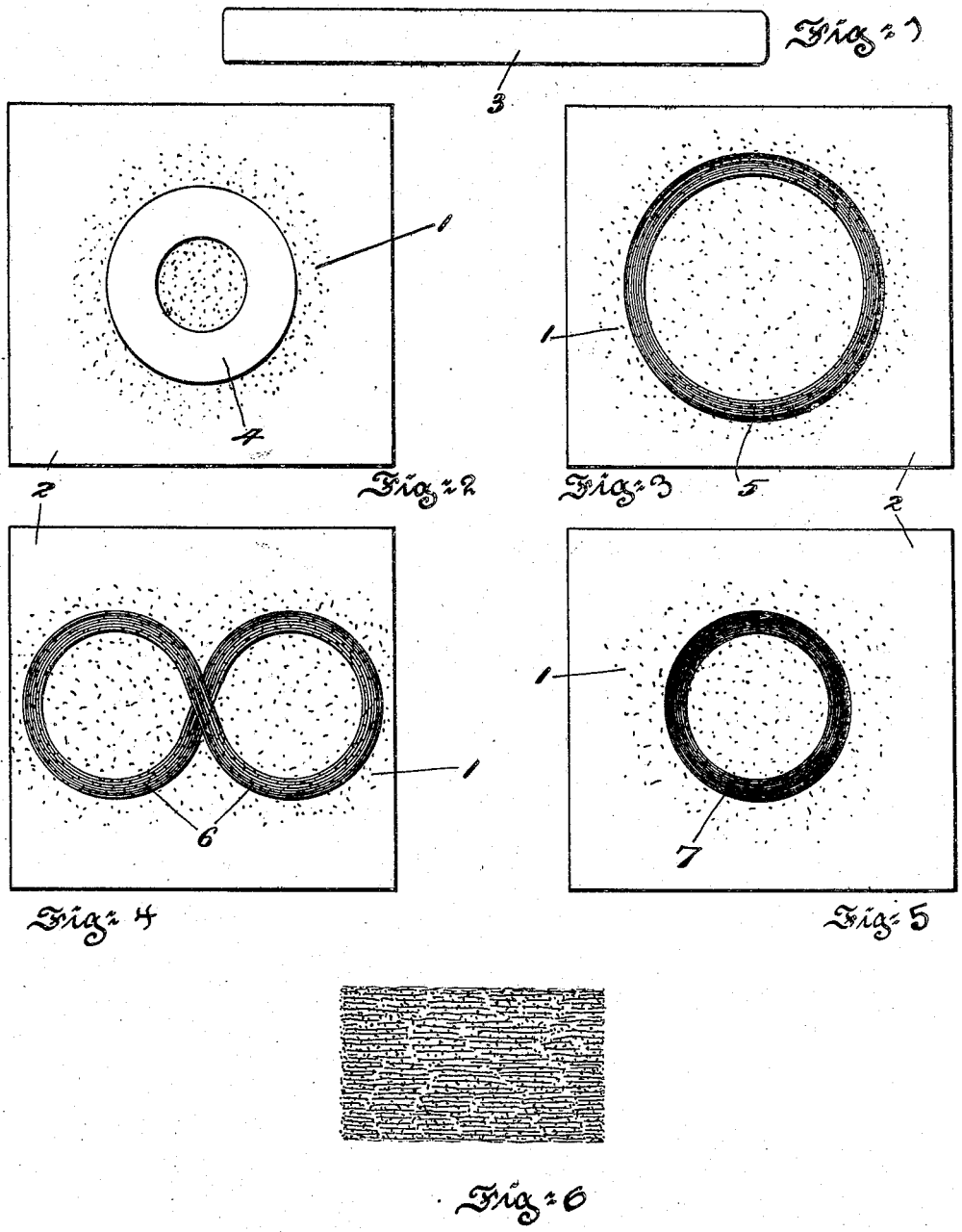

UNITED STATES PATENT OFFICE.

ROUPEN K. YACOOBIAN, OF PHILADELPHIA, PENNSYLVANIA.

CANDY AND PROCESS FOR MAKING SAME.

No. 921,052. Specification of Letters Patent. Patented May 11, 1909.

Application filed April 30, 1908. Serial No. 430,234.

*To all whom it may concern:*

Be it known that I, ROUPEN K. YACOOBIAN, a subject of the Sultan of Turkey, residing at Philadelphia, in the county of Philadelphia and State of Pennsylvania, have invented certain new and useful Improvements in Candies and Processes for Making Same, of which the following is a specification.
This invention relates to confectionery and has for its object to provide a novel candy comprising two distinct batches of material which are separately manufactured and afterward combined in a single article or piece of confectionery whereby each part retains its distinctive features and characteristics, but the two combine to afford to the consumer a candy of the desired consistency and edible peculiarities and a delicious flavor.
To this end my invention consists in a candy compounded of the ingredients and in the manner hereinafter described and particularly pointed out in the claims following the description references being had to the accompanying drawings forming part hereof and in which:

Figures 1, to 6, are views diagrammatically illustrating certain steps in the method of manufacturing the candy.
In making my improved confectionery I make up separately two distinct batches or masses of material of which the first consists of a taffy like compound comprising the following ingredients: sugar (preferably white), lemon juice, flavoring extract, oil of rose and water; and of which the other batch consists of a generally meal like mass comprising flour (preferably wheat flour), corn starch or pulverized chocolate or cocoa, and butter. To make the first mentioned batch or mass I take sugar in the substantial proportion of two-sevenths parts of the combined batches, 10 drops more or less of lemon juice, any suitable flavoring extract, water sufficient to prepare the batch for cooking and if desired, I add a perfume, as oil of rose, or other suitable extract and coloring matter. This mass I then boil over a very hot fire until the same candies at which time it is of a generally taffy like compound and having a generally creamy color. I then pull the candy until it assumes a white appearance. To make the last mentioned batch or mass I take flour (preferably wheat flour) in the substantial proportion of three-sevenths parts of the combined batches, one-seventh part corn starch or pulverized chocolate or cocoa, and one-seventh part butter and thoroughly mix the same and heat the same until it becomes of a light brown color.

Referring now to the drawings I take this meal like mass 1, while it is still warm and sprinkle it upon a confectioner's slab 2, or other suitable place, and also take the pulled candy 3, (see Fig. 1,) while it is still warm and convert it into a doughnut like ring 4, (see Fig. 2,) and place it upon the mealy compound 1. I now cause this ring like batch of candy to be rotated, pulled and kneaded with respect to the meal like mass 1, which as clearly illustrated in Fig. 3, will cause the doughnut like ring to expand and become much larger in diameter than at the beginning of the operation. I now take this expanded ring which I have designated 5, in Fig. 3, and fold the same into a double ring of the configuration of a figure 8, and designated 6, in Fig. 4. I now take this double ring like mass and double it over upon itself to again make a single ring designated 7, in Fig. 5. The above is then repeated and again repeated until after about fifteen minutes of operating the physical nature of the taffy like compound has undergone a complete change, or in other words, the solidity of the taffy has been drawn or pulled until the same has become a fibrous thread-like candy mass composed of nearly continuous fibers having starchy material in a finely powdered condition interspersed throughout the mass. The confectionery as described may be cut or fashioned into various shapes, forms or pieces of any desired size. In this connection it may be remarked that the confectionery is light and wholesome, is not affected by heat, and will remain fresh and retain its form for a long time, which is advantageous. In appearance it is of a silky like nature thoroughly impregnated with the starchy material in powdered form, (see Fig. 6) and in this connection it may be remarked that the starchy material serves to absorb moisture and in this way prevent the candy from becoming sticky. In making the confectionery a large quantity of oxygen is absorbed giving the substance medicinal qualities.

I do not confine myself to any certain proportion of ingredients as the same may be varied within the skill of the candy-maker without departing from the scope of my invention, also I do not wish to confine myself to the use of flavoring, perfuming extracts, or coloring matter.

What I claim is:

1. The process of making a fibrous thread like candy mass, which consists in cooking a batch of sugar, and flavoring material till it candies, then heating another batch of flour or starch and flavoring material till it browns, mixing the two batches together by pulling and kneading till the mixture is converted into a fibrous mass with the starchy material interspersed throughout the mass thereof, substantially as described.

2. A fibrous thread like candy mass composed of nearly continuous fibers, having starchy material in a fine powdery condition interspersed throughout the mass, substantially as described.

In testimony whereof I have hereunto signed my name.

ROUPEN K. YACOOBIAN.

In the presence of—
HAIG. Y. YARDERMIAN,
A. CULVERT BOYD.